(12) United States Patent
Han et al.

(10) Patent No.: US 11,475,537 B2
(45) Date of Patent: *Oct. 18, 2022

(54) METHOD AND APPARATUS WITH IMAGE NORMALIZATION

(71) Applicant: SAMSUNG ELECTRONICS CO., LTD., Suwon-si (KR)

(72) Inventors: Seungju Han, Seoul (KR); Minsu Ko, Suwon-si (KR); Changyong Son, Anyang-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,467

(22) Filed: Mar. 15, 2021

(65) Prior Publication Data

US 2021/0209726 A1    Jul. 8, 2021

Related U.S. Application Data

(63) Continuation of application No. 16/266,808, filed on Feb. 4, 2019, now Pat. No. 10,977,768.

(30) Foreign Application Priority Data

May 9, 2018    (KR) .................. 10-2018-0053302

(51) Int. Cl.
*G06K 9/34* (2006.01)
*G06T 3/00* (2006.01)
(Continued)

(52) U.S. Cl.
CPC ........ *G06T 3/0093* (2013.01); *G06K 9/00523* (2013.01); *G06T 5/50* (2013.01);
(Continued)

(58) Field of Classification Search
CPC . G06T 3/0093; G06T 5/50; G06T 7/11; G06T 7/174; G06T 7/194;
(Continued)

(56) References Cited

U.S. PATENT DOCUMENTS

2008/0219558 A1\* 9/2008 Lu ................... G06V 40/162
382/190
2010/0172579 A1\* 7/2010 Reid ................ G06V 40/161
382/199

(Continued)

FOREIGN PATENT DOCUMENTS

CN    107122751 A    9/2017
JP    2004-30629 A    1/2004

(Continued)

OTHER PUBLICATIONS

Seo, Jonghoon, et al. "Region-growing based Hand Segmentation Algorithm using Skin Color and Depth Information." Journal of Korea Multimedia Society 16.9 (2013): 1031-1043.

(Continued)

*Primary Examiner* — Huy C Ho

(74) *Attorney, Agent, or Firm* — NSIP Law

(57) ABSTRACT

A processor-implemented image normalization method includes extracting a first object patch from a first input image and extracting a second object patch from a second input image based on an object area that includes an object detected from any one or any combination of the first input image and the second input image, determining, based on a first landmark detected from the first object patch, a second (Continued)

landmark of the second object patch; and normalizing the first object patch and the second object patch based on the first landmark and the second landmark.

20 Claims, 7 Drawing Sheets

(51) Int. Cl.
  *G06K 9/00* (2022.01)
  *G06T 5/50* (2006.01)
  *G06T 7/174* (2017.01)
  *G06T 7/11* (2017.01)
  *G06T 7/194* (2017.01)

(52) U.S. Cl.
  CPC ............... *G06T 7/11* (2017.01); *G06T 7/174* (2017.01); *G06T 7/194* (2017.01); *G06T 2207/10024* (2013.01); *G06T 2207/10028* (2013.01)

(58) Field of Classification Search
  CPC . G06T 2207/10024; G06T 2207/10028; G06T 2207/10016; G06T 2207/30201; G06T 7/33; G06T 7/50; G06K 9/00523; G06V 10/25; G06V 40/165; G06V 40/171; G06V 10/20
  USPC ........................................................ 382/175
  See application file for complete search history.

(56) References Cited

U.S. PATENT DOCUMENTS

| 2010/0254573 | A1* | 10/2010 | Barlaud ............... G06F 16/7328 |
| | | | 382/190 |
| 2012/0243751 | A1 | 9/2012 | Zheng et al. |
| 2014/0307929 | A1 | 10/2014 | Nechyba et al. |
| 2015/0125049 | A1 | 5/2015 | Taigman et al. |
| 2016/0234474 | A1 | 8/2016 | Zhang et al. |
| 2017/0193284 | A1 | 7/2017 | Yoon et al. |

FOREIGN PATENT DOCUMENTS

| JP | 2007-233997 A | 9/2007 |
| JP | 2010-72910 A | 4/2010 |
| KR | 10-2011-0080327 A | 7/2011 |
| KR | 10-1212110 B1 | 12/2012 |
| KR | 10-2013-0098824 A | 9/2013 |
| KR | 10-2014-0001163 A | 1/2014 |
| KR | 10-2016-0088223 A | 7/2016 |
| KR | 10-2017-0080112 A | 7/2017 |

OTHER PUBLICATIONS

Korean Office Action dated Jul. 14, 2022, in counterpart Korean Patent Application No. 10-2018-0053302 (6 pages in Korean).

* cited by examiner

METHOD AND APPARATUS WITH IMAGE NORMALIZATION

CROSS-REFERENCE TO RELATED APPLICATION

This application is a continuation of U.S. application Ser. No. 16/266,808 filed on Feb. 4, 2019, which claims the benefit under 35 USC § 119(a) of Korean Patent Application No. 10-2018-0053302, filed on May 9, 2018, in the Korean Intellectual Property Office, the entire disclosure of which is incorporated herein by reference for all purposes.

BACKGROUND

1. Field

This application relates to a method and apparatus with image normalization.

2. Description of Related Art

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented image normalization method includes extracting a first object patch from a first input image and extracting a second object patch from a second input image based on an object area that includes an object detected from any one or any combination of the first input image and the second input image, determining, based on a first landmark detected from the first object patch, a second landmark of the second object patch; and normalizing the first object patch and the second object patch based on the first landmark and the second landmark.

The image normalization method may further include recognizing the object, based on an object recognition model, from a first normalized patch obtained by the normalizing of the first object patch, and a second normalized patch obtained by the normalizing of the second object patch.

The normalizing of the first object patch and the normalizing of the second object patch may include generating a first normalized patch and a second normalized patch by warping the first object patch and the second object patch in a predetermined format.

The extracting of the first object patch from the first input image and the extracting of the second object patch from the second input image may include detecting a first object area including the object from the first input image, and detecting a second object area including the object from the second input image; and extracting, based on the detecting of the first object area and the detecting of the second object area, the first object patch from the first input image, and the second object patch from the second input image.

The image normalization method may further include acquiring a color image as the first input image; and acquiring a depth image as the second input image.

The image normalization method may further include initializing a background area extracted from the second object patch.

The image normalization method may further include extracting a second background area from the second object patch, determining a first background area corresponding to the extracted second background area from the first object patch, and initializing the first background area.

The image normalization method may further include detecting an accessory area corresponding to an accessory occluding an object from the second object patch, and compensating for pixels corresponding to the accessory area from the first object patch, in response to the detecting of the accessory area.

The determining of the second landmark may include detecting a main landmark from the second object patch, and determining the second landmark by mapping the first landmark to the second object patch based on the main landmark.

The determining of the second landmark may include detecting a main landmark from the second object patch, and adjusting the first landmark based on the main landmark.

The image normalization method may further include acquiring the first input image and the second input image that has a same field of view (FOV) as a FOV of the first input image.

The extracting of the first object patch from the first input image and the extracting of the second object patch from the second input image may include extracting a partial image corresponding to an image having a relatively small FOV from an image having a relatively large FOV, between the first input image and the second input image, and extracting an object patch from each of the partial image and the image having the relatively small FOV.

The extracting of the first object patch from the first input image and the extracting of the second object patch from the second input image may include detecting the object area including the object from one image between the first input image and the second input image, extracting a reference object patch including the object area from the image from which the object area is detected, and extracting a target object patch corresponding to an FOV of the reference object patch from the other image between the first input image and the second input image.

In a general aspect, an image normalization apparatus includes an image acquirer configured to acquire a first input image and a second input image, and a processor configured to extract a first object patch from the first input image and extract a second object patch from the second input image based on an object area that includes an object detected from any one or any combination of the first input image and the second input image, normalize the first object patch and the second object patch based on the first landmark and the second landmark.

The image normalization apparatus may further include a memory configured to store an object recognition model configured to generate a recognition result based on a normalized patch, wherein the processor is further configured to recognize the object, based on the object recognition model being provided a first normalized patch obtained by the normalizing of the first object patch, and a second normalized patch obtained by the normalizing of the second object patch.

After the determining of the first landmark and the second landmark, the processor may be configured to generate a first normalized patch and a second normalized patch by warping the first object patch and the second object patch in a predetermined format.

The image acquirer may be configured to acquire the first input image and the second input image that has a same field of view (FOV) as a FOV of the first input image.

The image acquirer may be configured to acquire a color image as the first input image and acquire a depth image as the second input image.

The processor may be configured to extract a second background area from the second object patch, determine a first background area corresponding to the extracted second background area from the first object patch, distinguish a foreground image from a background image by initializing any one or any combination of the first background area and the second background area.

In a general aspect, a processor-implemented image normalization method includes obtaining a color image and a depth image, detecting an object area from one of the color image and the depth image, extracting a first object patch from the color image and a second object patch from the depth image, detecting a first landmark from the first object patch and a second landmark from the second object patch, and, normalizing the first object patch and the second object patch based on the first landmark and the second landmark.

Object recognition may be performed using a trained machine learning model to provide a recognition result based on the color image and the depth image.

Other features and aspects will be apparent from the following detailed description, the drawings, and the claims.

Figure 1:
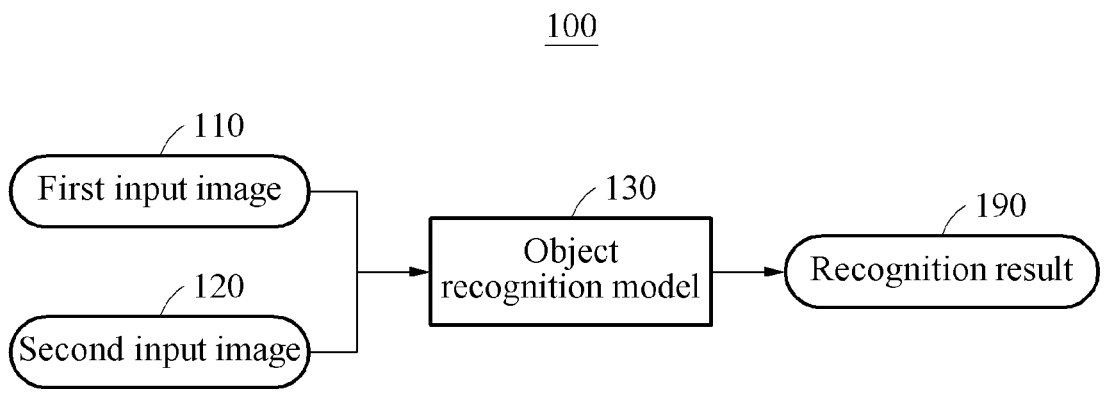
FIG. 1 illustrates an example of an object recognition process based on a plurality of input images.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Unless otherwise defined herein, all terms used herein including technical or scientific terms have the same meanings as those generally understood after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings, and like reference numerals in the drawings refer to like elements throughout.

FIG. 1 illustrates an example of an object recognition process based on a plurality of input images.

An object recognition system 100 generates a recognition result 190 based on an object recognition model 130 from a first input image 110 and a second input image 120. For example, an image normalization apparatus of the object recognition system 100 acquires the first input image 110 and the second input image 120. The image normalization apparatus of the object recognition system 100 normalizes the first input image 110 and the second input image 120, and inputs the normalized first input image 110 and the normalized second input image 120 to the object recognition model 130, to generate the recognition result 190. In the following description, a recognition may include a verification and an identification. The verification may be an operation of determining whether input data is true or false, and the identification may be an operation of determining which one of a plurality of labels is indicated by input data.

The first input image 110 and the second input image 120 may be images representing the same object or may be different types of images. For example, the first input image 110 may be one of a color image, a depth image, and an infrared image, and the second input image 120 may be one of the remaining images. In the following description, an example in which the first input image 110 is a color image and the second input image 120 is a depth image is mainly described. However, this is merely an example and examples are not limited thereto. Also, the first input image 110 and the second input image 120 may have the same field of view (FOV). However, examples are not limited thereto.

In an example, a color image is an image captured by a color sensor (for example, a color camera). The color image is an image representing a plurality of colors. For example, the color image may include three color channel images, and each of the three-color channel images may have an intensity of light corresponding to a corresponding color as a pixel value. Color channels forming a color image may include, for example, RGB channels, however, examples are not limited thereto. Channels based on various color spaces may also be used.

The infrared image is an image that may be captured by an infrared sensor (for example, an infrared camera), for example. The infrared image has an intensity of light corresponding to infrared rays as a pixel value.

The depth image is an image that may be captured by a depth sensor (for example, a depth camera, a time-of-flight (ToF) camera, or a stereo camera), as non-limiting examples. The depth image may indicate distances to corresponding points as pixel values, for example.

An object recognition model is a machine learning model configured to output the recognition result 190 in response to an input of a normalized image. The object recognition model 130 has the machine learning structure, and includes a parameter of a machine learning structure trained based on training data. For example, the object recognition model 130 may include a neural network, noting that examples are not limited thereto. The neural network may include a plurality of layers that each include a plurality of nodes. Also, the neural network may include connection weights that connect a plurality of nodes included in one of the plurality of layers to nodes included in another layer. The neural network is implemented by, for example, hardware, or a combination of hardware and software. The neural network is referred to as an "artificial neural network (ANN)," as a non-limiting example.

The neural network may be a deep neural network (DNN), as a non-limiting example. In such an example, the DNN may be one or more of a fully connected network, a deep convolutional network, and/or a recurrent neural network, or may include different or overlapping neural network portions respectively with such full, convolutional, or recurrent connections. The neural network may be configured to perform, as non-limiting examples, feature abstraction, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a big data set, as non-limiting examples. The deep learning may be implemented by mapping of input data and the output data through supervised or unsupervised learning training, such that when trained the resultant machine learning model, engine, or example NN may intuitively map further input data to output data with a desired accuracy and/or desired inaccuracy. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto. The neural network may implement an artificial neuron referred to as a "node," noting that the term "neuron" is only a term of art, and is not related to how biological systems operate. Nodes are connected to each other via edges with connection weights. A connection weight is a predetermined value of an edge, and may be referred to as a "connection intensity." The connection weight may also be casually referred to as synapses or synaptic weights although such references are not intended to impart any relatedness with respect to how the neural network architecture computationally maps or thereby intuitively recognizes information and how a human's synapses operate, i.e., the term synapse or synaptic weight is merely a term of art referring to the hardware implemented connections or the corresponding 'connection weights' provided by those connections of a neural network. During training and implementation such connections and connection weights may be selectively implemented and varied to generate or obtain a resultant neural network that is thereby trained and that may be correspondingly implemented for the trained objective, such as for any of the above example recognition objectives.

Referring again to FIG. 1, the object recognition model 130 may be trained through supervised learning. The supervised learning may be a scheme of inputting, to a neural network, a training input of training data together with a trained output corresponding to the training input, and updating connection weights of edges so that output data corresponding to the trained output is output. In an example object identification, a training input represents a first reference image and a second reference image that are normalized, and a training output represents an object identifier (for example, a label) corresponding to the first reference image and the second reference image.

The recognition result 190 is a result of a recognition performed based on the object recognition model 130. For example, in an object identification, the recognition result 190 shows a label as an identifier that indicates an identification of an object appearing on the first input image 110 and the second input image 120.

The image normalization apparatus enhances an accuracy of a recognition of the object recognition model 130 by inputting an image converted into a standardized format to the above-described object recognition model 130. Hereinafter, operations of normalizing an input image to input the input image to the object recognition model 130 will be described.

Figure 2:
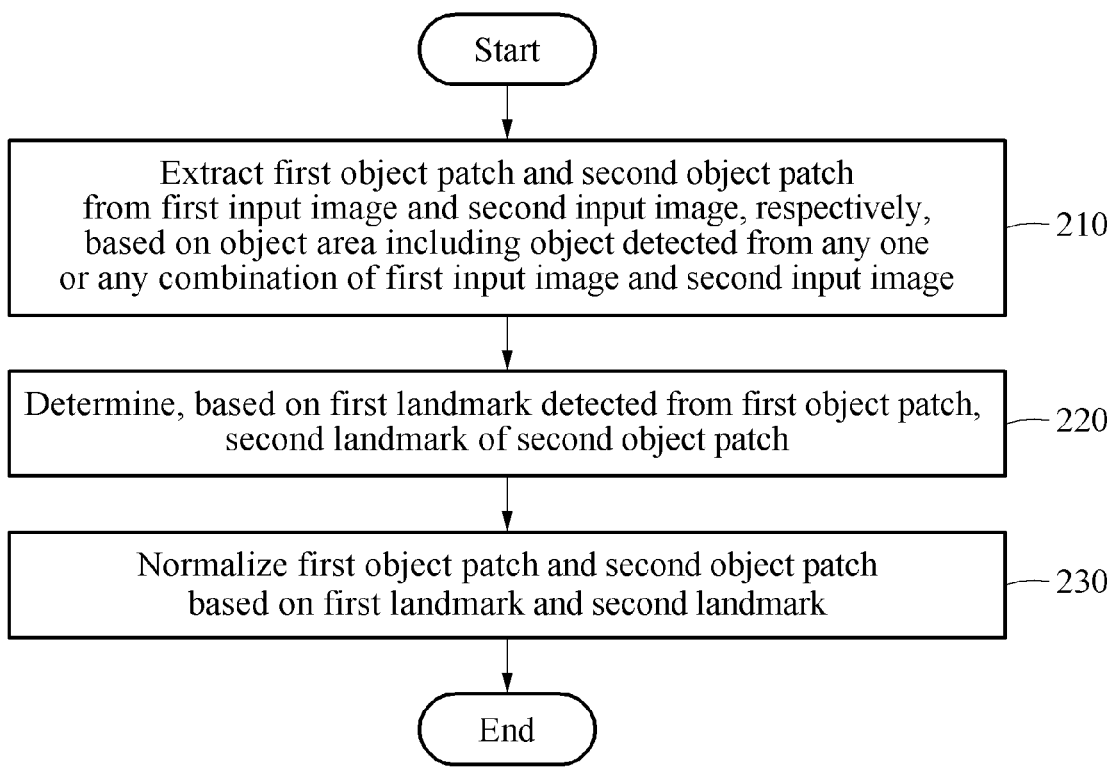
FIG. 2 is a flowchart illustrating an example of an image normalization method.

FIG. 2 is a flowchart illustrating an example of an image normalization method.

The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware or other processors and computer instructions.

In addition to the description of FIG. 2 below, the description of FIG. 1 is also applicable to FIG. 2, as a non-limiting example, and is incorporated herein by reference. Thus, the above description may not be repeated here.

Referring to FIG. 2, in operation 210, an image normalization apparatus extracts a first object patch and a second object patch from a first input image and a second input image, respectively, based on an object area that includes an object detected from any one or any combination of the first input image and the second input image.

The object area is an area including an object in an image. The object area is a set of pixels indicating the object. For example, the first object area is an area including an object in the first input image. The first object area may be a set of pixels indicating the object in the first input image. For example, when the first input image is a color image, the first object area is an area of the color image in which an object appears. The second object area is an area including an object in the second input image. The second object area is a set of pixels indicating the object in the second input image. For example, when the second input image is a depth image, the second object area is an area of the depth image in which an object appears.

The first object patch is a patch including the first object area. A patch is a partial image corresponding to a portion of an entire image, and may correspond to a rectangular area. However, the patch is not limited to a rectangular image. The first object patch may be a patch corresponding to a rectangular area including the first object area. The second object patch is a patch including the second object area. The second object patch may be a patch corresponding to a rectangular area including the second object area.

In operation 220, the image normalization apparatus determines, based on a first landmark detected from the first object patch, a second landmark of the second object patch. For example, the image normalization apparatus detects the first landmark from the first object patch. The image normalization apparatus determines the second landmark by mapping the first landmark to the second object patch.

In an example, a landmark is a feature point representing a feature of an object. For example, when an object is a face of a human, a landmark represents, for example, an eye, a nose or a mouth of the face. The first landmark is a feature point representing a feature of an object shown in the first object patch. The second landmark is a feature point representing a feature of an object shown in the second object patch.

The second landmark is determined by mapping of the first landmark, however, examples are not limited thereto. For example, the second landmark is detected from the second object area.

In operation 230, the image normalization apparatus normalizes the first object patch and the second object patch based on the first landmark and the second landmark. For example, the image normalization apparatus generates a first normalized patch and a second normalized patch by warping the first object patch and the second object patch in a predetermined format. The format is a format of an image input to an object recognition model, and defines, for example, a size, a number of pixels and a resolution of the image and a location of a landmark.

For example, the image normalization apparatus aligns landmarks corresponding to an arbitrary portion (for example, a nose) of an object patch at a location designated for the portion within the format. To align the landmarks, the image normalization apparatus converts pixels corresponding to the landmarks together with pixels neighboring the landmarks. For example, the image normalization apparatus deforms the first object patch so that the first landmark matches a location designated for the landmark within the format. The image normalization apparatus deforms the second object patch so that the second landmark matches a location designated for the landmark within the format. For example, when the first object patch and the second object patch each represent a side surface of an object, a first normalized object patch and a second normalized object patch each represent a front side of the object. A first normalized patch is a patch obtained by normalizing the first object patch based on the first landmark. A second normalized patch is a patch obtained by normalizing the second object patch based on the second landmark.

Figure 3:
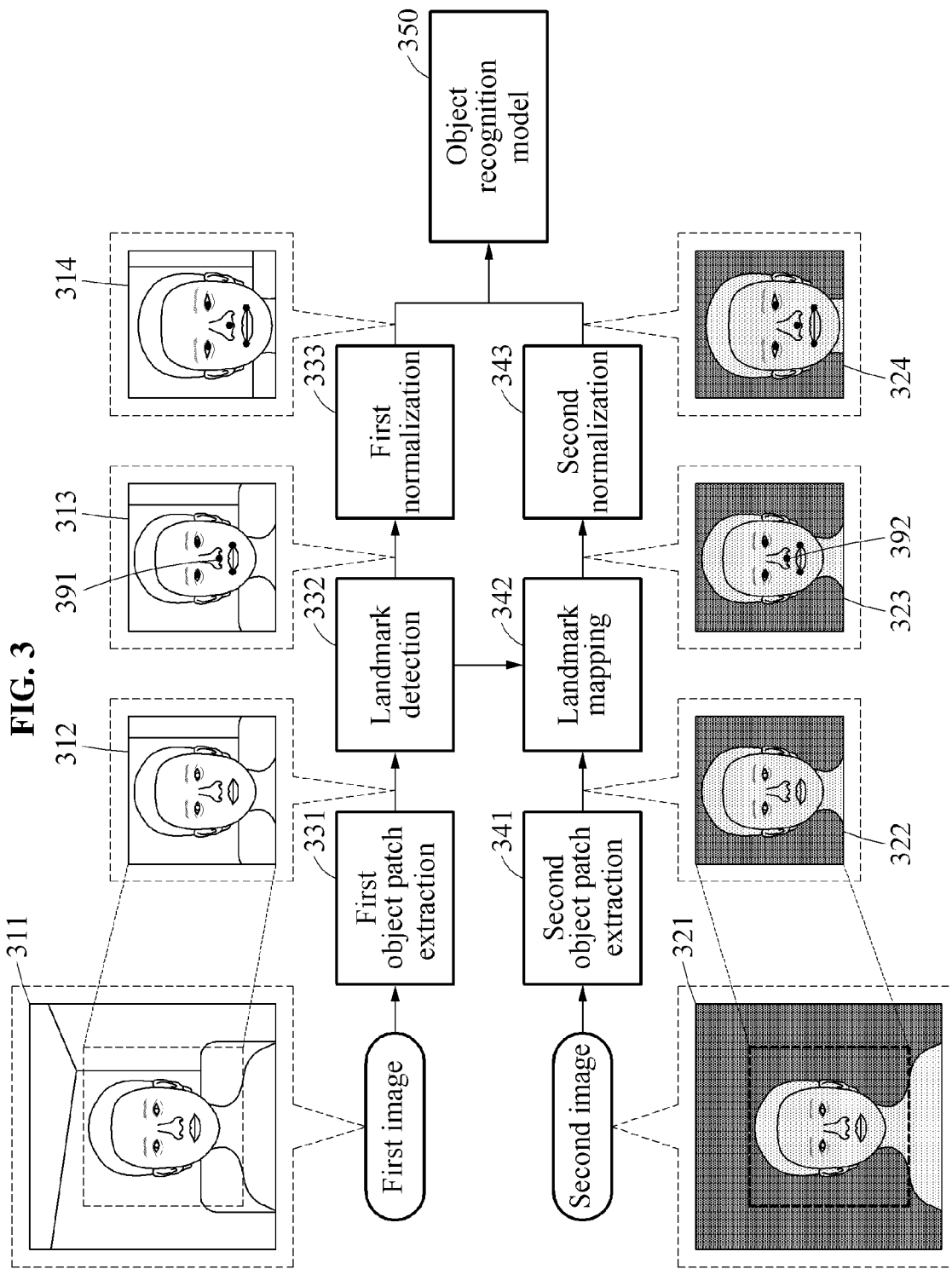
FIGS. 3 and 4 illustrate examples of an image normalization.
Figure 4:
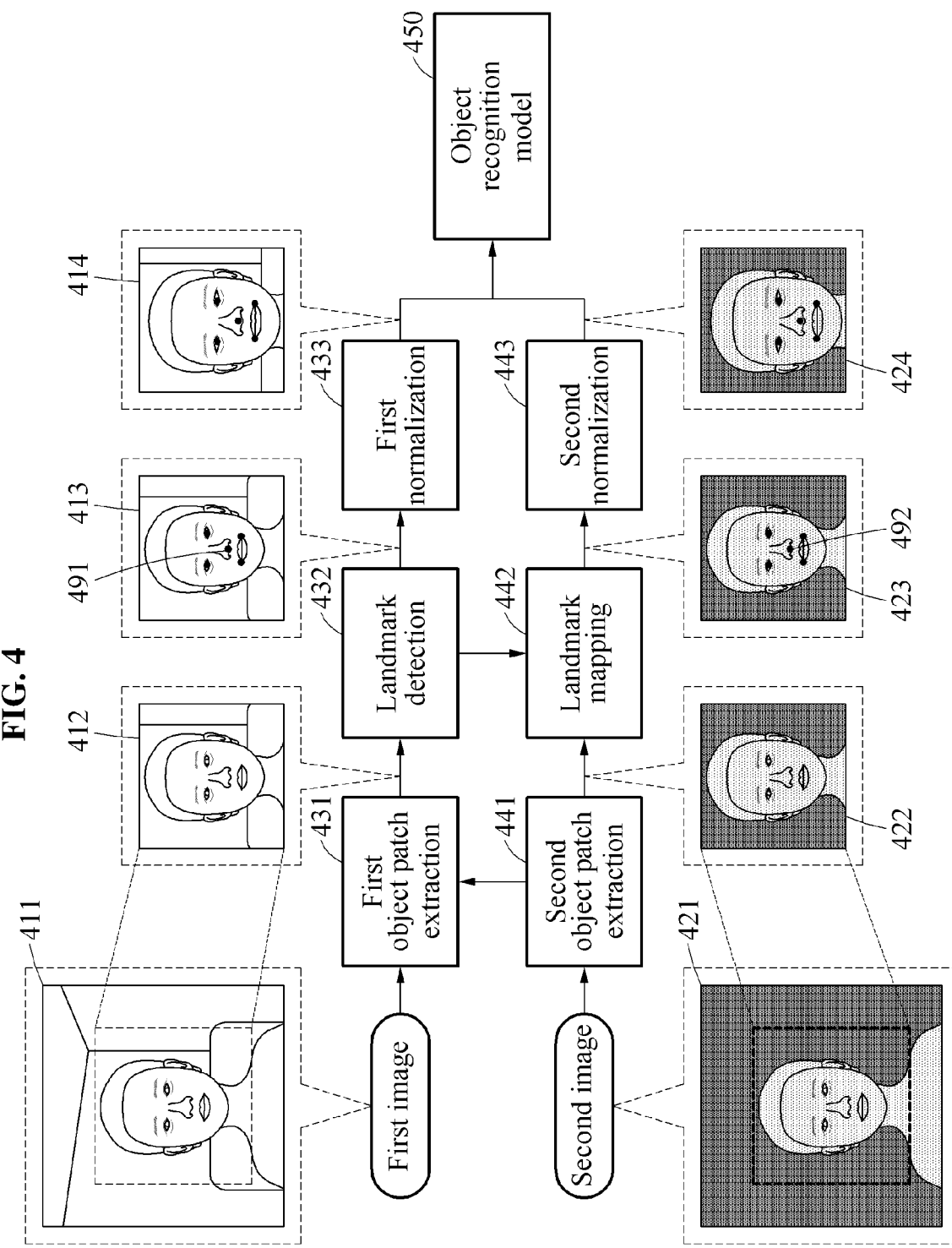

FIGS. 3 and 4 illustrate examples of an image normalization.

FIG. 3 illustrates an example of generating a first normalized patch 314 and a second normalized patch 324 from a first input image 311 and a second input image 321, to input the first normalized patch 314 and the second normalized patch 324 to an object recognition model 350. FIG. 3 illustrates an example of reflecting a first landmark 391 extracted from the first input image 311 to the second input image 321.

An image normalization apparatus acquires the first input image 311 and the second input image 321. In FIG. 3, the image normalization apparatus acquires the first input image 311, and the second input image 321 that has the same field of view (FOV) as the FOV of the first input image 311.

However, examples are not limited thereto. For example, when an FOV of the first input image 311 is different from an FOV of the second input image 321, the image normalization apparatus matches the FOV of the first input image 311 and the FOV of the second input image 321. For example, the image normalization apparatus extracts a partial image corresponding to an image having a relatively small FOV from an image having a relatively large FOV, between the first input image 311 and the second input image 321. Accordingly, the image normalization apparatus matches the FOV of the first input image 311 and the FOV of the second input image 321, based on an image having a relatively small FOV between the first input image 311 and the second input image 321. In a first object patch extraction 331 and a second object patch extraction 341, the image normalization apparatus extracts an object patch from each of the partial image and the image having the relatively small FOV.

The image normalization apparatus performs the first object patch extraction 331. For example, the image normalization apparatus extracts, from the first input image 311, a first object patch 312 including a first object area. The image normalization apparatus identifies pixels indicating an object from the first input image 311 using an object detection algorithm, and determines a set of the pixels indicating the object as a first object area. The image normalization apparatus performs the second object patch extraction 341. For example, the image normalization apparatus extracts, from the second input image 321, a second object patch 322 including a second object area. When the FOV of the first input image 311 is different from the FOV of the second input image 321, the image normalization apparatus extracts the first object patch 312 and the second object patch 322 that have the same FOV, instead of matching the FOV of the first input image 311 and the FOV of the second input image 321 as described above.

For example, the image normalization apparatus detects a first object area including an object from the first input image 311 and detects a second object area including an object from the second input image 321. The image normalization apparatus extracts the first object patch 312 and the second object patch 322 from the respective first input image 311 and the second input image 321, based on the first object area and the second object area, respectively.

In an example, the image normalization apparatus extracts the first object patch 312 including the first object area from the first input image 311, and extracts the second object patch 322 including the second object area from the second input image 321.

In another example, the image normalization apparatus determines a common object area from the first object area and the second object area. The image normalization apparatus extracts the first object patch 312 corresponding to the common object area from the first input image 311, and extracts the second object patch 322 corresponding to the common object area from the second input image 321. The common object area is an area determined based on the first object area and the second object area, and includes, for example, an overlapping area between the first object area and the second object area, and an area defined as a boundary corresponding to an intermediate position between a boundary of the first object area and a boundary of the second object area.

The image normalization apparatus may perform a landmark detection 332. For example, the image normalization apparatus detects the first landmark 391 from the first object patch 312.

Also, the image normalization apparatus performs a landmark mapping 342. For example, the image normalization apparatus determines a second landmark 392 by mapping the first landmark 391 to the second object patch 322.

The image normalization apparatus performs a first normalization 333. For example, the image normalization apparatus normalizes a first object patch 313 based on the first landmark 391. Also, the image normalization apparatus performs a second normalization 343. For example, the image normalization apparatus normalizes a second object patch 323 based on the second landmark 392.

The image normalization apparatus inputs the first normalized patch 314 and the second normalized patch 324 to the object recognition model 350.

FIG. 4 illustrates an image normalization based on a first landmark 491 extracted from a first input image 411 and a second object area detected from a second input image 421.

An image normalization apparatus acquires the first input image 411 and the second input image 421. Similar to the above description of FIG. 3, the image normalization apparatus acquires the first input image 411 and the second input image 421 that have the same FOV. When an FOV of the first input image 411 is different from an FOV of the second input image 421, the image normalization apparatus adjusts the FOVs to be identical to each other.

For example, the image normalization apparatus detects an object area including an object from one of the first input image 411 and the second input image 421. The image normalization apparatus extracts a reference object patch including the object area from one image from which the object area is detected. The image normalization apparatus also extracts a target object patch corresponding to an FOV of the reference object patch from the other image.

In an example, when the first object patch 412 is a reference object patch, the second object patch 422 is a target object patch. In another example, when the second object patch 422 is a reference object patch, the first object patch 412 is a target object patch. In the following description, the second object patch 422 is a reference object patch and the first object patch 412 is a target object patch when the second input image 421 is a depth image. However, this is merely an example. Accordingly, operations of the image normalization apparatus are not limited to description that will be provided below.

The image normalization apparatus performs a second object patch extraction 441. For example, the image normalization apparatus extracts a second object patch 422 including a second object area from the second input image 421. The image normalization apparatus determines the second object patch 422 as a reference object patch. When the second input image 421 is a depth image, the image normalization apparatus identifies pixels having depth values less than a threshold depth in the depth image. The image normalization apparatus determines a set of the pixels having the depth values less than the threshold depth as the second object area. In the depth image, an object appears in a foreground rather than a background, and a depth value of a pixel corresponding to the object is less than a depth value of a pixel corresponding to the background. Thus, the image normalization apparatus distinguishes the foreground from the background in the depth image based on depth values, and determines an area corresponding to the foreground as the second object area.

The image normalization apparatus performs a first object patch extraction 431. For example, the image normalization apparatus determines, as the first object patch 412 (for example, a target object patch), an area corresponding to the second object patch 422 that is the reference object patch from the first input image 411. When the first input image 411 and the second input image 421 have the same FOV, the first input image 411 and the second input image 421 are pixel-to-pixel matched to each other. Thus, the image normalization apparatus determines a pixel that is included in the first input image 411 and that corresponds to a position of a pixel that is included in the second object patch 422 in the second input image 421 to be the first object patch 412.

Also, the image normalization apparatus performs a landmark detection process 432. Similar to the above description, the image normalization apparatus extracts the first landmark 491 from the first object patch 412.

The image normalization apparatus performs a landmark mapping 442. The image normalization apparatus determines a second landmark 492 by mapping the first landmark 491 to the second object patch 422.

The image normalization apparatus performs a first normalization 433. For example, the image normalization apparatus normalizes, based on the first landmark 491, a first object patch 413 to which the first landmark 491 is mapped. The image normalization apparatus performs a second normalization 443. For example, the image normalization apparatus normalizes, based on the second landmark 492, a second object patch 423 to which the second landmark 492 is mapped.

The image normalization apparatus generates a recognition result by inputting a first normalized patch 414 and a second normalized patch 424 to an object recognition model 450. For example, the image normalization apparatus recognizes an object based on the object recognition model 450 from the first normalized patch 414 obtained by normalizing the first object patch 412 and the second normalized patch 424 obtained by normalizing the second object patch 422.

As described above, the image normalization apparatus normalizes the second input image 421 based on information extracted from the first input image 411, or normalizes the first input image 411 based on information extracted from the second input image 421. Thus, the image normalization apparatus normalizes an image by utilizing a characteristic of a depth image that may be effectively used to detect an object area and a characteristic of a color image that may be effectively used to detect a landmark.

Figure 5:
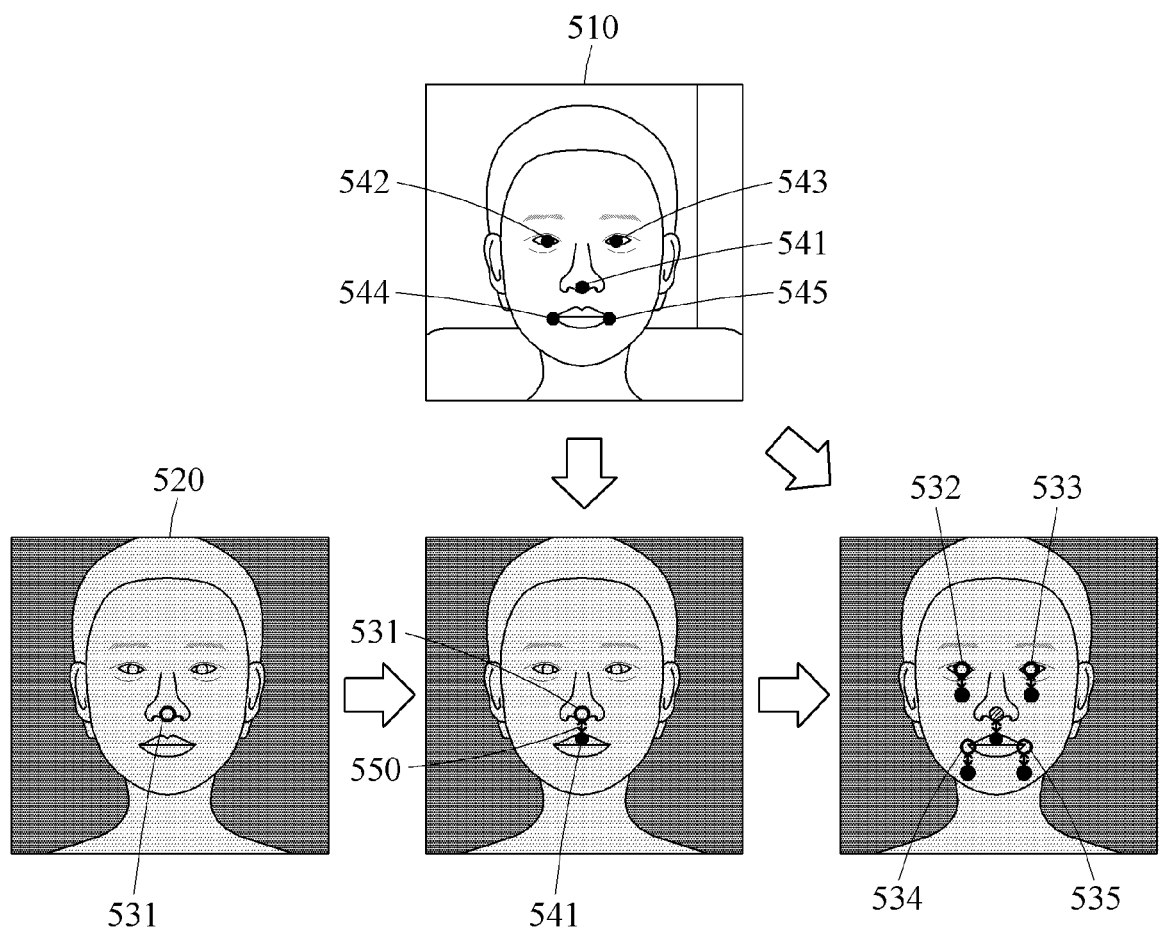
FIG. 5 illustrates an example of adjusting a landmark.

FIG. 5 illustrates an example of adjusting a landmark.

An image normalization apparatus detects a main landmark from a second object patch. The main landmark is a designated landmark among a plurality of landmarks, and includes, for example, a landmark used as a criterion of arrangement of landmarks. For example, when an object is a human face, the main landmark may be a landmark indicating a nose part.

The image normalization apparatus maps a first landmark to the second object patch based on the main landmark, and determines a second landmark.

For example, referring to FIG. 5, the image normalization apparatus detects a main landmark 531 from a second object patch 520. The image normalization apparatus also detects a landmark 541 corresponding to the main landmark 531 from a first object patch 510. The image normalization apparatus calculates an error 550 between the main landmark 531 of the second object patch 520 and the landmark 541 of the first object patch 510. The image normalization apparatus extracts the other landmarks, for example, first landmarks 542 through 545, from the first object patch 510. The image normalization apparatus determines the other landmarks, for example, second landmarks 532 through 535, by reflecting the calculated error 550 to the first landmarks 542 through 545.

The determining of the second landmark based on the main landmark has been described above with reference to FIG. 5, however, examples are not limited thereto. The image normalization apparatus also determines the first landmark based on the main landmark. The image normalization apparatus adjusts the first landmark based on the main landmark detected from the second object patch. For example, the image normalization apparatus reflects, to the first landmark, an error between the main landmark detected from the second object patch and a landmark that corresponds to the main landmark and that is detected from the first object patch.

In addition, the extracting of landmarks from the first object patch and the second object patch, or the determining of a landmark of each of the first object patch and the second object patch has been described above with reference to FIG. 5. However, examples are not limited thereto. The image normalization apparatus also performs an operation associated with landmarks for the first input image and the second input image.

Figure 6:
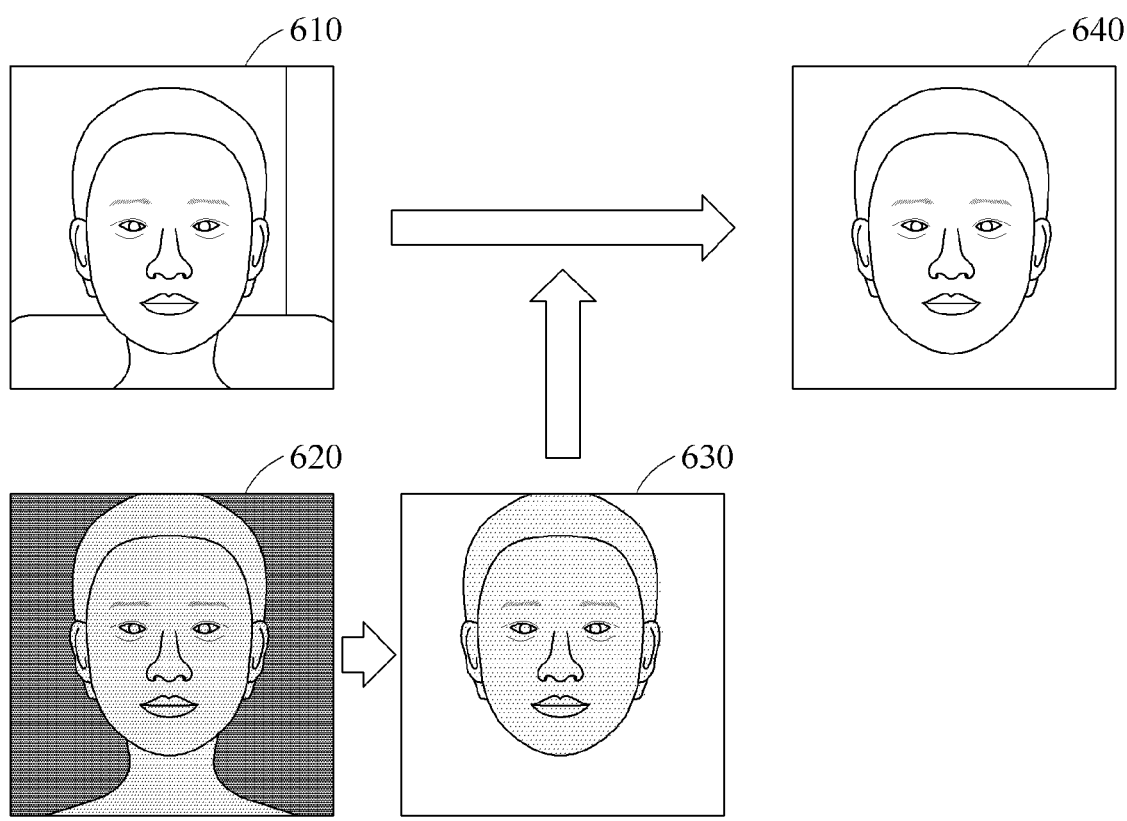
FIG. 6 illustrates an example of removing a background area.

FIG. 6 illustrates an example of removing a background area.

An image normalization apparatus initializes a background area extracted from a second object patch 620. For example, when a second input image is a depth image, the image normalization apparatus classifies pixels included in the second object patch 620 into a foreground pixel and a background pixel, based on depth values of the pixels in the second object patch 620. For example, the image normalization apparatus determines a pixel having a depth value less than a threshold depth to be a foreground pixel, and determines a pixel having a depth value greater than or equal to the threshold depth to be a background pixel. The image normalization apparatus changes pixel values (for example, a depth value when a corresponding image is a depth image) of pixels corresponding to the background pixel area to a default value (for example, a value of "0"), to initialize the background area.

In an example, the image normalization apparatus determines, from a first object patch 610, a first background area 640 corresponding to a second background area 630 extracted from the second object patch 620. The first object patch 610 and the second object patch 620 have the same FOV, and pixels in the first object patch 610 and pixels in the second object patch 620 are matched to each other. The image normalization apparatus determines that a pixel that is included in the first object patch 610 and that corresponds to a pixel included in the second background area 630 of the second object patch 620 belongs to the first background area 640. The image normalization apparatus may initialize the first background area 640 determined as described above. For example, the image normalization apparatus may change values of pixels corresponding to the first background area 640 to a value of "0" to initialize the first background area 640.

In an example, the image normalization apparatus accurately excludes a portion of a color image corresponding to a background from the color image, based on information associated with a background extracted from a depth image that may be effectively used to distinguish between a foreground and a background.

In an example, the first background area 640 may represent a background portion obtained by excluding an object from the first object patch 610. The second background area 630 represents a background portion obtained by excluding an object from the second object patch 620.

Figure 7:
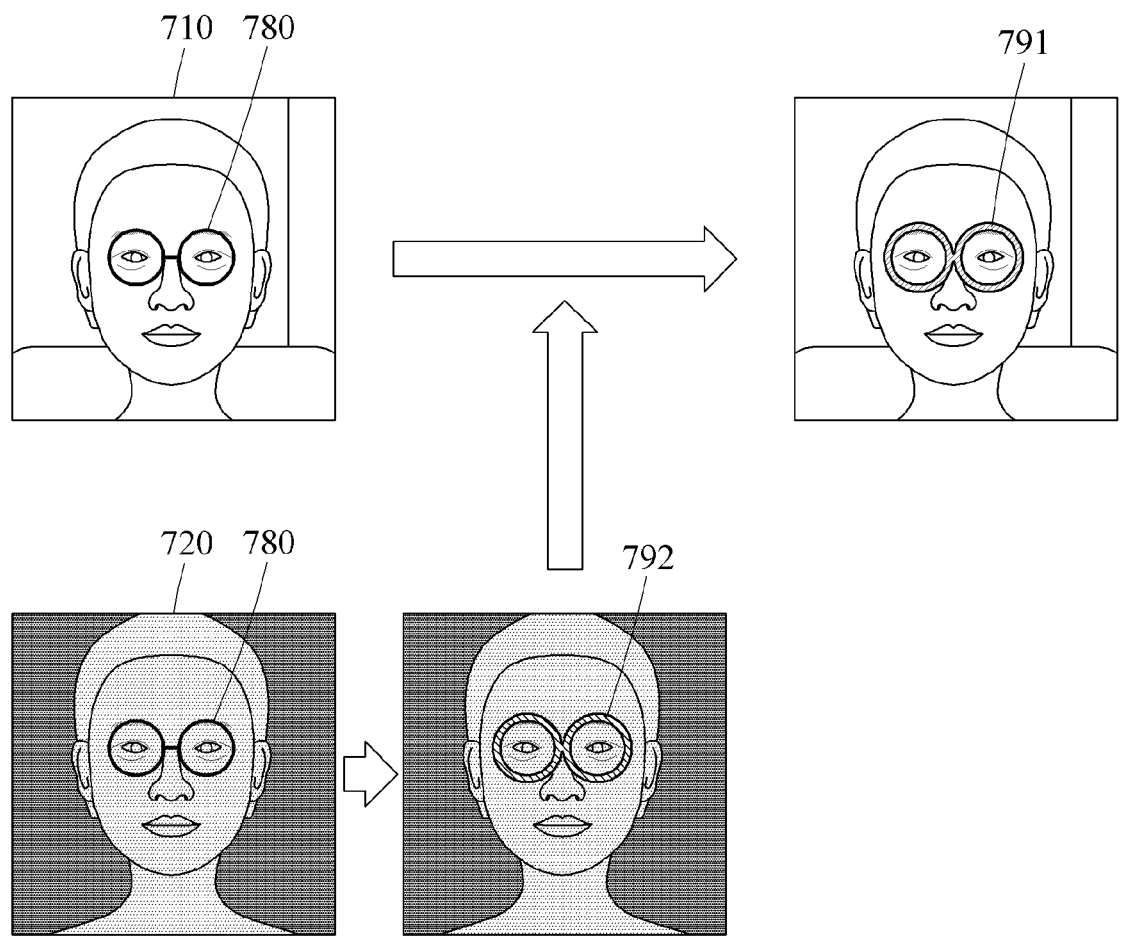
FIG. 7 illustrates an example of removing an accessory area.

FIG. 7 illustrates an example of removing an accessory area.

An image normalization apparatus detects an accessory area 792 corresponding to an accessory 780, for example, spectacles, occluding an object from a second object patch 720. In an example, the accessory area 792 may be a set of pixels indicating the accessory 780. The accessory 780 may be mounted in or attached to an object, and includes, for example, glasses, sunglasses, a mask, or a hand, but is not limited thereto. When a second input image is a depth image, the image normalization apparatus accurately distinguishes between a distance to an object and a distance to the accessory 780 preceding the object. For example, the image normalization apparatus determines that a pixel with a depth value less than an accessory threshold in comparison to neighboring pixels within an object area belongs to an accessory area 792.

In response to the accessory area 792 being detected, the image normalization apparatus compensates for pixels 791 corresponding to the accessory area 792 from a first object patch 710. For example, the image normalization apparatus determines an intermediate value based on values of pixels located around the accessory area 792, and pads the pixels 791 that are in the first object patch 710 and that correspond to the accessory area 792, based on the determined intermediate value. However, examples are not limited thereto, and the image normalization apparatus may pad the accessory area 792 based on various statistical values.

Thus, in response to a detection of an accessory, the image normalization apparatus may accurately supplement the accessory area 792 for a color image, based on accessory-related information extracted based on a depth image. Also, pixels corresponding to the accessory area 792 may be selectively compensated for only when the accessory 780 appears, and thus the image normalization apparatus may maintain an accurate recognition regardless of the presence of an accessory.

Figure 8:
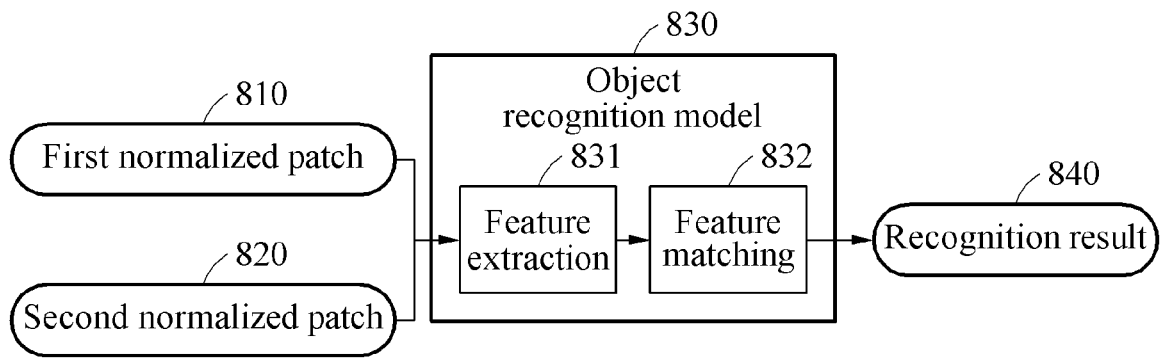
FIG. 8 illustrates an example of an operation of an object recognition model.

FIG. 8 illustrates an example of an operation of an object recognition model 830.

As described above, the object recognition model 830 is configured to output a recognition result 840 in response to an input of a normalized patch. For example, an image normalization apparatus may input a first normalized patch 810 and a second normalized patch 820 to the object recognition model 830.

The image normalization apparatus may perform a feature extraction 831 on the first normalized patch 810 and the second normalized patch 820. For example, the image normalization apparatus may extract feature information from input information (for example, an input vector) generated based on the first normalized patch 810 and the second normalized patch 820. The feature information may represent, for example, a feature vector generated by abstracting a feature of an object in an image.

The image normalization apparatus may perform a feature matching 832 on the feature information. For example, the image normalization apparatus may compare the feature information to a registration feature that is registered in a database (DB). The image normalization apparatus may determine a registration feature vector that is most similar to an input feature vector extracted from an input vector based on a comparison between the input feature vector and a registration feature vector registered in the DB. The image normalization apparatus may determine, as the recognition result 840, a label corresponding to an identifier corresponding to the most similar registration feature vector.

Figure 9:
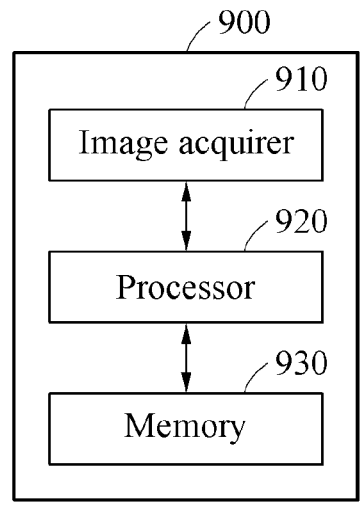
FIG. 9 is a block diagram illustrating an example of a configuration of an image normalization apparatus.

FIG. 9 is a block diagram illustrating an example of a configuration of an image normalization apparatus 900.

Referring to FIG. 9, the image normalization apparatus 900 includes an image acquirer 910, a processor 920, and a memory 930.

The image acquirer 910 may acquire a first input image and a second input image. The first input image and the second input image may be acquired at the same FOV as described above, however, examples are not limited thereto. The image acquirer 910 includes a color sensor, a depth sensor, or an infrared sensor. In an example, the image acquirer 910 may include a color sensor and a depth sensor that are spaced apart from each other. In another example, the image acquirer 910 includes an image sensor integrated with a color sensor and a depth sensor.

The processor 920 may extract a first object patch and a second object patch from the first input image and the second input image, respectively, based on an object area that includes an object detected from any one or any combination of the first input image and the second input image. The processor 920 may determine, based on a first landmark detected from the first object patch, a second landmark of the second object patch. The processor 920 may normalize the first object patch and the second object patch based on the first landmark and the second landmark. However, an operation of the processor 920 is not limited to the above-described operations, and the processor 920 may perform any one, any combination, or all of the operations described above with reference to FIGS. 1 through 8.

The memory 930 may temporarily or semi-permanently store data used to perform an image normalization method. For example, the memory 930 may store a landmark, a normalized patch and an object patch extracted from each input image. Also, the memory 930 may store an object recognition model.

As a non-exhaustive example only, the image normalization apparatuses as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The object recognition system 100, the image normalization apparatus 900, the image acquirer 910, the processor 920, the memory 930, and other apparatuses of FIGS. 1-9 are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented image normalization method comprising:
    extracting a partial image corresponding to an image having a relatively small field of view (FOV) from an image having a relatively large FOV, between a first input image and a second input image;
    extracting a first object patch of a first input image and extracting a second object patch of a second input image, from each of the partial image and the image having the relatively small FOV, based on an object area that includes an object detected from any one or any combination of the first input image and the second input image;

determining, based on a first landmark detected from the first object patch, a second landmark of the second object patch; and normalizing the first object patch and the second object patch based on the first landmark and the second landmark.

2. The method of claim 1, further comprising:
recognizing the object, based on an object recognition model, from a first normalized patch obtained by the normalizing of the first object patch, and a second normalized patch obtained by the normalizing of the second object patch.

3. The method of claim 1, wherein the normalizing of the first object patch and the normalizing of the second object patch comprise generating a first normalized patch and a second normalized patch by warping the first object patch and the second object patch in a predetermined format.

4. The method of claim 1, wherein the extracting of the first object patch from the first input image and the extracting of the second object patch from the second input image comprises:
detecting a first object area including the object from the first input image, and detecting a second object area including the object from the second input image; and
extracting, based on the detecting of the first object area and the detecting of the second object area, the first object patch from the first input image, and the second object patch from the second input image.

5. The method of claim 1, further comprising:
acquiring a color image as the first input image; and
acquiring a depth image as the second input image.

6. The method of claim 1, further comprising:
initializing a background area extracted from the second object patch.

7. The method of claim 1, further comprising:
extracting a second background area from the second object patch;
determining a first background area corresponding to the extracted second background area from the first object patch; and
initializing the first background area.

8. The method of claim 1, further comprising:
detecting an accessory area corresponding to an accessory occluding an object from the second object patch; and
compensating for pixels corresponding to the accessory area from the first object patch, in response to the detecting of the accessory area.

9. The method of claim 1, wherein the determining of the second landmark further comprises:
detecting a main landmark from the second object patch;
determining the second landmark by mapping the first landmark to the second object patch based on the main landmark; and
adjusting the first landmark based on the main landmark.

10. The method of claim 1, wherein the extracting of the first object patch from the first input image and the extracting of the second object patch from the second input image comprises:
detecting the object area including the object from one image between the first input image and the second input image;
extracting a reference object patch including the object area from the image from which the object area is detected; and
extracting a target object patch corresponding to an FOV of the reference object patch from the other image between the first input image and the second input image.

11. A non-transitory computer-readable storage medium storing instructions that, when executed by a processor, cause the processor to perform the method of claim 1.

12. An electronic device comprising:
a color sensor configured to capture a color image as a first input image;
a depth sensor configured to capture a depth image as a second input image; and
a processor configured to
extract a partial image corresponding to an image having a relatively small field of view (FOV) from an image having a relatively large FOV, between the first input image and the second input image;
extract a first object patch of the first input image and extract a second object patch of the second input image, from each of the partial image and the image having the relatively small FOV, based on an object area that includes an object detected from any one or any combination of the first input image and the second input image,
determine, based on a first landmark detected from the first object patch, a second landmark of the second object patch, and
normalize the first object patch and the second object patch based on the first landmark and the second landmark.

13. The device of claim 12, further comprising:
a memory configured to store an object recognition model configured to generate a recognition result based on a normalized patch,
wherein the processor is further configured to
recognize the object, based on the object recognition model being provided a first normalized patch obtained by the normalizing of the first object patch, and a second normalized patch obtained by the normalizing of the second object patch.

14. The device of claim 12, wherein, after the determining of the first landmark and the second landmark, the processor is configured to generate a first normalized patch and a second normalized patch by warping the first object patch and the second object patch in a predetermined format.

15. The device of claim 12, wherein the processor is further configured to:
detect a first object area including the object from the first input image, and detecting a second object area including the object from the second input image; and
extract, based on the detecting of the first object area and the detecting of the second object area, the first object patch from the first input image, and the second object patch from the second input image.

16. The device of claim 12, wherein the processor is further configured to:
initialize a background area extracted from the second object patch.

17. The device of claim 12, wherein the processor is further configured to:
extract a second background area from the second object patch;
determine a first background area corresponding to the extracted second background area from the first object patch; and distinguish a foreground image from a background image by initializing any one or any combination of the first background area and the second background area.

18. The device of claim 12, wherein the processor is further configured to:
detect an accessory area corresponding to an accessory occluding an object from the second object patch; and
compensate for pixels corresponding to the accessory area from the first object patch, in response to the detecting of the accessory area.

19. The device of claim 12, wherein the processor is further configured to:
detect a main landmark from the second object patch;
determine the second landmark by mapping the first landmark to the second object patch based on the main landmark; and
adjust the first landmark based on the main landmark.

20. The device of claim 12, wherein the processor is further configured to:
detect the object area including the object from one image between the first input image and the second input image;
extract a reference object patch including the object area from the image from which the object area is detected; and
extract a target object patch corresponding to an FOV of the reference object patch from the other image between the first input image and the second input image.

\* \* \* \* \*